Dec. 6, 1927.
R. W. BILES ET AL
1,652,086
PROTECTIVE ARRANGEMENT FOR DUPLICATE FEEDER ELECTRIC SYSTEMS
Filed Dec. 15, 1926
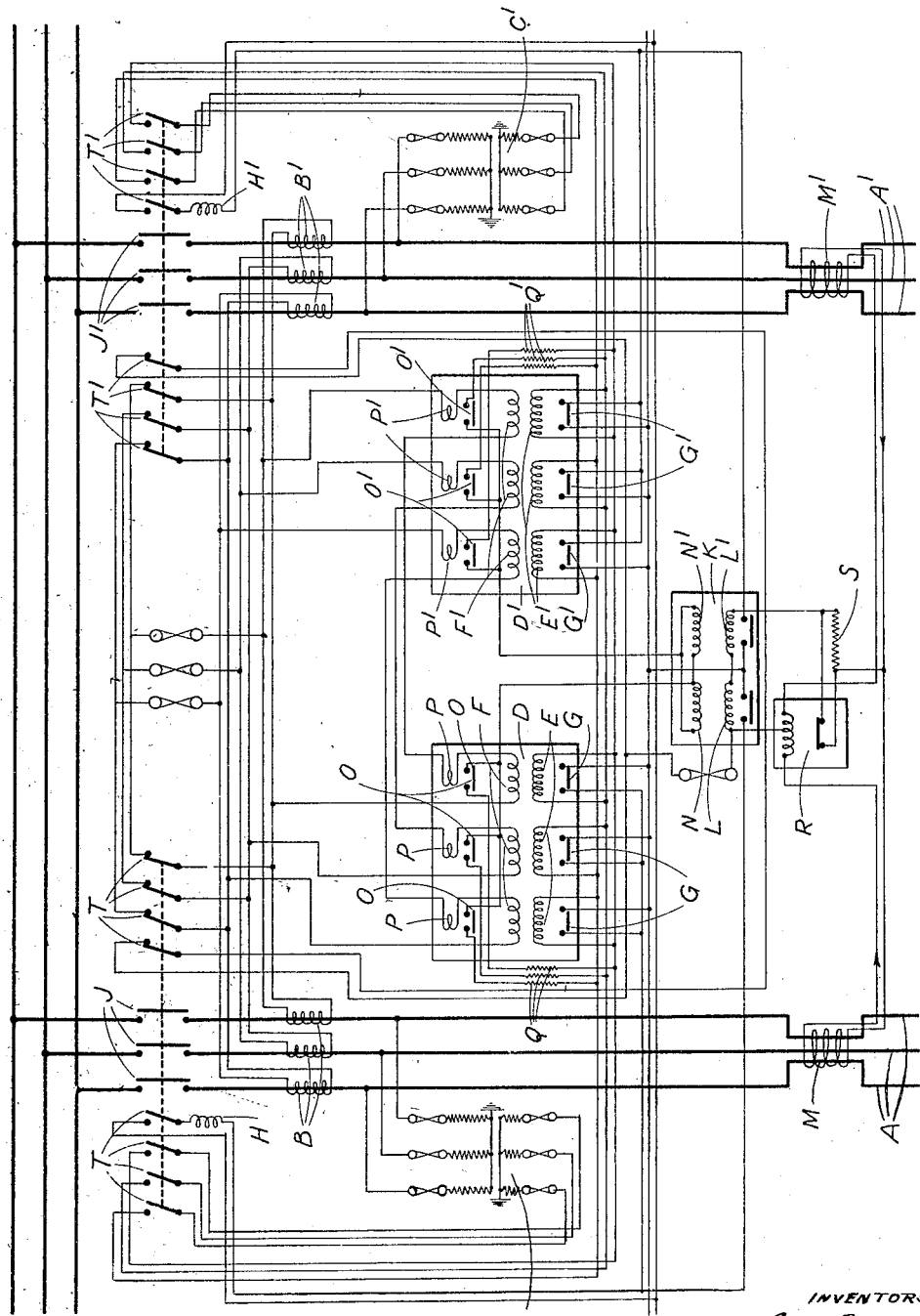

Patented Dec. 6, 1927.

1,652,086

UNITED STATES PATENT OFFICE.

REGINALD WILLIAM BILES, OF BALCOMBE, AND JEAN PIQUET, OF WELWYN HEATH, NEAR WELWYN, ENGLAND, ASSIGNORS TO A. REYROLLE & COMPANY LIMITED, OF HEBBURN-ON-TYNE, ENGLAND, A COMPANY OF GREAT BRITAIN.

PROTECTIVE ARRANGEMENT FOR DUPLICATE-FEEDER ELECTRIC SYSTEMS.

Application filed December 15, 1926, Serial No. 155,082, and in Great Britain January 28, 1926.

This invention relates to a protective arrangement for a duplicate feeder electric system. In such arrangements the usual procedure is to balance the currents flowing through the two feeders in a discriminating or directional relay. This method necessitates the use of heavy settings above the full load of the two feeders for all types of fault.

The object of the present invention is to provide a far more sensitive relay setting for earth faults, in polyphase systems, whilst retaining the usual heavy settings for interphase faults, and to this end, according to the invention, protection against earth faults on the two feeders is afforded by means of a directional earth leakage relay. The operation of such a relay must depend on the phase relationship between the voltage and the current in the feeder circuits, and, since an earth fault may occur at any time on any phase, it is not known beforehand what the phase value of the fault current will be. In order to ensure correct operation of the earth leakage relay, means are provided whereby its potential coils are automatically connected, when a fault occurs, to a potential supply having correct phase relationship to the current flowing in the current coils of the relay.

This automatic connection is preferably effected by means of auxiliary contactors energized from current transformers in the protected feeders. Conveniently a discriminating relay or two differentially arranged directional relays are provided to deal with interphase faults, and in this case the same current transformers may be employed to energize both the auxiliary contactors and also the current coils of such relay or relays, whilst the potential supply to the potential coils of the earth leakage relay may be obtained from the same source as that to the potential coils of these relays.

The invention may be carried into practice in various ways, but the accompanying drawing illustrates a preferred arrangement according thereto for a three-phase duplicate feeder system.

Each of the two feeders A A$^1$ is provided with a current transformer in each phase, and the secondaries B B$^1$ of these current transformers in corresponding phases in the two feeders are connected together. Each feeder is also provided with a three-phase potential transformer and the secondaries C C$^1$ of the two potential transformers are normally connected in parallel.

Protection against interphase faults is afforded by means of two three-pole reverse power relays D D$^1$, whose potential coils E E$^1$ are suitably connected to the circuits containing the potential transformer secondaries C C$^1$. The current coils F F$^1$ of these two relays D D$^1$ in each phase are connected in series with one another in or across the circuit containing the current transformer secondaries B B$^1$ in that phase. Thus when an interphase fault occurs in one of the feeders, one or other of the two relays D D$^1$ (depending on the direction of current flow in the secondary circuits) will operate its contacts G (or G$^1$) to complete the circuit to the trip coil H (or H$^1$) of a circuit breaker J (or J$^1$) and thus to cut out the faulty feeder, the sound feeder remaining in circuit.

Protection against earth faults is afforded by means of a directional earth leakage relay K, whose current coils L L$^1$ are energized from the connected secondaries of two core balance transformers M M$^1$, one in each feeder. The potential coils N N$^1$ of this earth leakage relay K are connected through the contacts O O$^1$ of auxiliary contactors P P$^1$ to the secondary circuits of the potential transformers C C$^1$.

The operating coils of the auxiliary contactors P P$^1$ are connected in series respectively with the current coils F F$^1$ of the two reverse power relays D D$^1$ in each phase, and these contactors may be mounted in the casings of the relays D D$^1$ or may be separate therefrom.

Thus when an earth fault occurs in one of the phases of one of the feeders, the contactor or contactors P P$^1$ in that phase will be energized and the closing of their contacts O O$^1$ will connect the potential coils N N$^1$ of the earth leakage relay across the correct phases of the potential transformer secondaries C C$^1$, and will thus operate the trip coil H (or H$^1$) for the circuit-breaker J (or J$^1$) in the faulty feeder.

The best operating conditions will be obtained if the current in the potential coils N N$^1$ of the earth leakage relay K lags behind the current in the current coils L L$^1$ by 30° when the power factor in the feeder circuits is unity.

In order to prevent short-circuiting of the potential transformer secondaries C C¹ if the auxiliary contactors P P¹ in two phases should simultaneously close their contacts when an interphase fault occurs, current limiting resistances Q Q¹ are inserted between the contacts O O¹ of the contactors and the potential transformer secondaries C C¹.

A relatively insensitive diverter relay R is preferably provided in the circuit of the current coils L L¹ of the earth leakage relay K, and is so arranged that it will introduce or cut-out a resistance S in that circuit or will otherwise reduce the sensitiveness of the earth leakage relay during heavy straight-through earth-fault currents, whilst leaving such sensitiveness unimpaired when a fault occurs on the protected feeders in question.

Each main circuit-breaker J (or J¹) preferably has associated with it a set of auxiliary switches T (or T¹) which act when the circuit-breaker is tripped to short-circuit the current coils F F¹ L L¹ of the reverse power relays D D¹ and the earth leakage relay K and also to isolate the potential transformer C (or C¹) of the disconnected feeder on the secondary side.

It will be understood that the above arrangement has been described by way of example only and that modifications may be made without departing from the scope of the invention. Thus for instance the two reverse power relays may be replaced by a single directional relay of the watt-meter type.

What we claim as our invention and desire to secure by Letters Patent is:—

1. A protective arrangement for a duplicate feeder electric system, comprising a circuit-breaker in each of the two protected feeders, a directional earth leakage relay controlling the circuit-breakers and having potential coils and current coils, means for supplying current derived from the feeders to the current coils, and means whereby when an earth fault occurs on one of the feeders the potential coils are automatically connected to a potential supply having correct phase relationship to the current flowing in the current coils so that the relay acts to cut out the faulty feeder.

2. A protective arrangement for a duplicate feeder electric system, comprising a circuit-breaker in each of the two protected feeders, a directional earth leakage relay controlling the circuit-breakers and having potential coils and current coils, means for supplying current derived from the feeders to the current coils, current transformers in the feeders, and auxiliary contactors energized from the current transformers and acting when an earth fault occurs on one of the feeders to connect the potential coils of the relay to a potential supply having correct phase relationship to the current flowing in the current coils so that the relay acts to cut out the faulty feeder.

3. A protective arrangement for a duplicate feeder electric system, comprising a circuit-breaker in each of the two protected feeders, a directional earth leakage relay controlling the circuit-breakers and having potential coils and current coils, means for supplying current derived from the feeders to the current coils, means whereby when an earth fault occurs on one of the feeders the potential coils are automatically connected to a potential supply having correct phase relationship to the current flowing in the current coils so that the relay acts to cut out the faulty feeder, and a directional relay device so arranged as to be operative in the event of an interphase fault to cut out the faulty feeder.

4. A protective arrangement for a duplicate feeder electric system, comprising a circuit-breaker in each of the two protected feeders, a directional earth leakage relay controlling the circuit-breakers and having potential coils and current coils, means for supplying current derived from the feeders to the current coils, auxiliary contactors acting when an earth fault occurs on one of the feeders to connect the potential coils of the earth leakage relay to a potential supply having correct phase relationship to the current flowing in the current coils so that the relay acts to cut out the faulty feeder, a directional relay device having potential coils and current coils so arranged as to be operative in the event of an interphase fault to cut out the faulty feeder, and current transformers in the feeders for supplying current to the auxiliary contactors and to the current coils of the directional relay device.

5. A protective arrangement for a duplicate feeder electric system, comprising a circuit-breaker in each of the two protected feeders, a directional earth leakage relay controlling the circuit-breakers and having potential coils and current coils, means for supplying current derived from the feeders to the current coils, a directional relay device having potential coils and current coils so arranged as to be operative in the event of an interphase fault to cut out the faulty feeder, means for energizing the current coils of the directional relay device, potential transformers in the feeders for energizing the potential coils of the directional relay device, and means whereby when an earth fault occurs on one of the feeders the potential coils of the earth leakage relay are connected to a potential supply having correct phase relationship to the current flowing in the current coils, so that the relay acts to cut out the faulty feeder, such potential supply being obtained from the potential transformers.

6. A protective arrangement for a duplicate feeder electric system, comprising a circuit-breaker in each of the two protected feeders, a directional earth leakage relay controlling the circuit-breakers and having potential coils and current coils, core balance transformers in the protected feeders for energizing the current coils of the earth leakage relay, a directional relay device having potential coils and current coils, current transformers in the feeders for energizing the current coils of the relay device, potential transformers in the feeders for energizing the potential coils of the relay device, and auxiliary contactors energized from the current transformers and controlling the connection between the potential transformers and the potential coils of the earth leakage relay, the arrangement being such that an earth fault on one of the feeders will cause the earth leakage relay to operate to cut out the faulty feeder whilst an interphase fault on one of the feeders will cause the directional relay device to operate to cut out the faulty feeder.

7. A protective arrangement for a duplicate feeder electric system, comprising a circuit-breaker in each of the two protected feeders, a directional earth leakage relay controlling the circuit-breakers and having potential coils and current coils, means for supplying current derived from the feeders to the current coils, two differentially arranged reverse power relays having current and potential coils one relay being associated with each feeder, means associated with said differentially arranged relays whereby when an earth fault occurs on one of the feeders the potential coils of the directional earth leakage relay are automatically connected to a potential supply having correct phase relationship to the current flowing in the current coils of that relay so that the relay acts to cut out the faulty feeder, and means whereby in the event of an interphase fault on one of the feeders the associated reverse power relay is operative to cut out the faulty feeder.

8. A protective arrangement for a duplicate feeder electric system, comprising current transformers in the protected feeders, potential transformers in the protected feeders, two differentially-arranged reverse power relays having current coils energized from the current transformers and potential coils energized from the potential transformers, a directional earth leakage relay having current coils and potential coils, core balance transformers in the feeders for supplying current to the current coils of the earth leakage relay, means associated with said differentially arranged relays whereby in the event of an earth fault on one of the feeders the potential coils of the earth leakage relay are brought into circuit with the potential transformers and the relay acts to cut out the faulty feeder, and means whereby in the event of an interphase fault on one of the feeders one of the reverse power relays is operative to cut out the faulty feeder.

9. In a protective arrangement for a duplicate feeder electric system, the combination with the features claimed in claim 1, of an auxiliary switch associated with each circuit-breaker and acting when the circuit-breaker is open to short-circuit the current coils of the earth leakage relay.

10. In a protective arrangement for a duplicate feeder electric system, the combination with the features claimed in claim 2, of an auxiliary switch associated with each circuit-breaker and acting when the crcuit-breaker is open to short-circuit the current coils of the earth leakage relay.

11. In a protective arrangement for a duplicate feeder electric system, the combination with the features claimed in claim 4, of auxiliary switches associated with each circuit-breaker and acting when the circuit-breaker is open to short-circuit the current coils of the earth leakage relay and of the directional relay device.

12. In a protective arrangement for a duplicate feeder electric system, the combination with the features claimed in claim 5, of auxiliary switches associated with each circuit-breaker and acting when the circuit-breaker is open to short-circuit the current coils of the earth leakage relay and of the directional relay device and to isolate the secondary side of the potential transformer in the faulty feeder.

13. In a protective arrangement for a duplicate feeder electric system, the combination with the features claimed in claim 7, of auxiliary switches associated with each circuit-breaker and acting when the circuit-breaker is open to short-circuit the current coils of the earth leakage relay and of the two reverse power relays.

In witness whereof we have signed our names to this specification.

REGINALD WILLIAM BILES.
JEAN PIQUET.